UNITED STATES PATENT OFFICE.

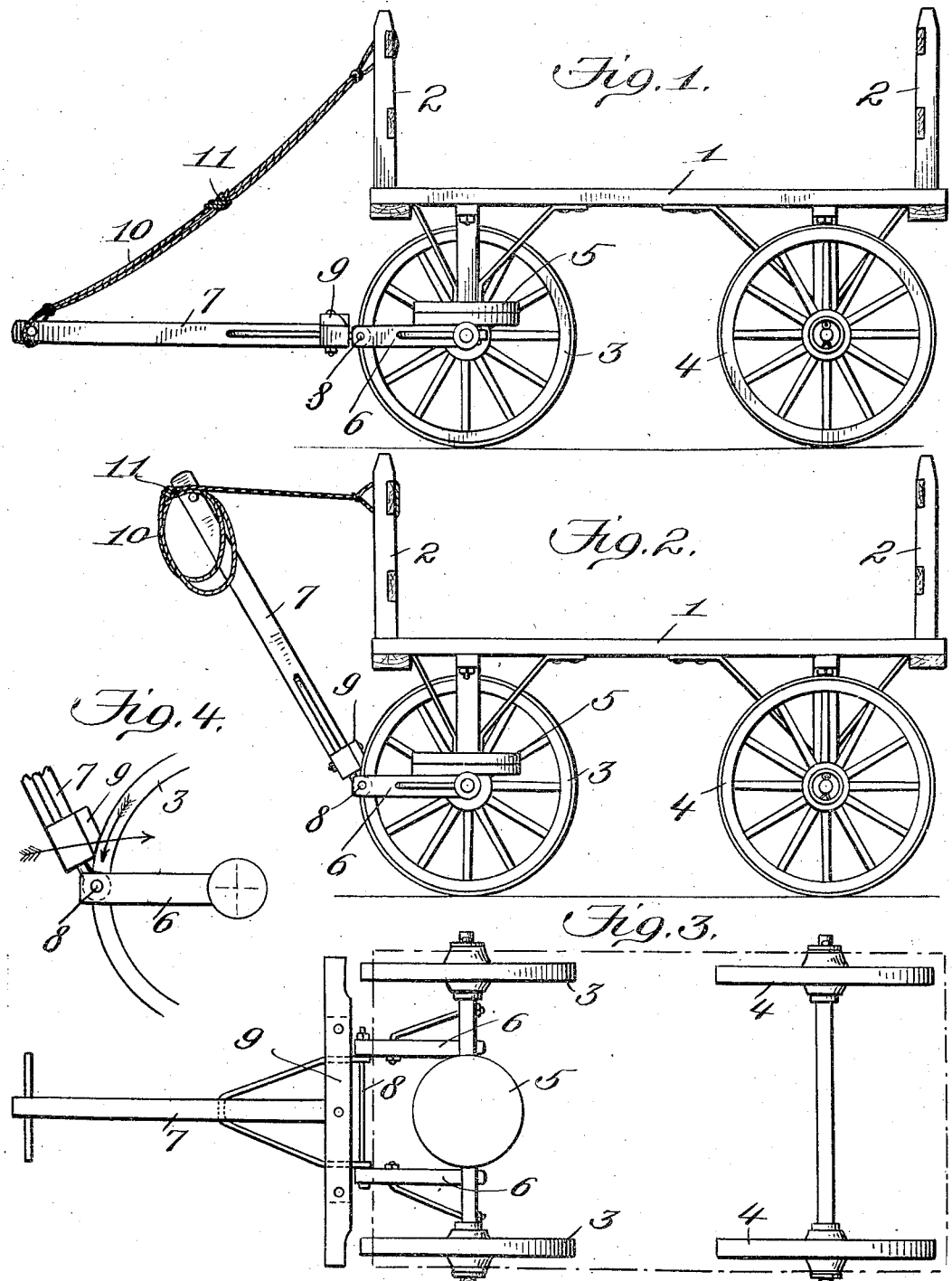

HARRY S. PARKER, OF TRENTON, NEW JERSEY.

VEHICLE-BRAKE.

No. 849,918.  Specification of Letters Patent.  Patented April 9, 1907.

Application filed December 5, 1906. Serial No. 346,490.

*To all whom it may concern:*

Be it known that I, HARRY S. PARKER, a citizen of the United States, residing at Trenton, in the county of Mercer and State of New Jersey, have invented new and useful Improvements in Vehicle-Brakes, of which the following is a specification.

This invention relates to a brake for vehicles, and particularly manually-controlled baggage-trucks.

It is well understood that it is impracticable to equip baggage-trucks with ordinary brake devices used on other vehicles, because the operation of the common form of brake mechanisms if applied to baggage-trucks would necessitate considerable care in disposing baggage on the trucks to avoid injury to the operating-levers, and as baggage must be expeditiously handled annoyance would result by reason of the care that would have to be exercised in loading trucks equipped with ordinary vehicle-brake mechanism. A further objection to ordinary vehicle-brake mechanism on baggage-trucks is that the latter are usually under the control of a single attendant or baggageman and the brake-lever could not be readily reached, and, in fact, it would be necessary to stop the truck before practical actuation of the ordinary vehicle-brake mechanism could be effected.

The primary object of the present invention is to provide a baggage-truck with a brake device adjacent to the front wheels and controllable by actuation of the draft-tongue, so that the movement of the truck may be quickly and effectively checked without straining or breaking any of the parts of the running-gear.

A further object of the invention is to so dispose a braking device with relation to the running-gear of a baggage-truck that comparatively little leverage is required to forcefully and positively apply the brake device and to cause the weight on the truck to assist in the braking operation when the braking device is brought into engagement with a portion of the truck-wheels.

The invention consists, essentially, in rigidly securing a brake bar or beam to the hinged or movably-attached tongue of a baggage-truck, the bar or beam being located slightly in advance of the front wheels of the truck and close to the pivotal or hinged connection for the tongue, the pivotal or hinged connection for the tongue being practically in alinement with the peripheries of the front portions of the forward wheels of the truck to cause the opposite individually-immovable extremities of the brake bar or beam to engage the forward portions of the front wheels of the truck approximately in right-angular planes when the draft-tongue of the truck is raised.

The invention still further consists of a baggage-truck having a draft-tongue with a braking bar or beam rigidly secured thereon to engage the forward wheels and provided with means for holding the tongue elevated and the braking-bar in contact with the wheels.

In the drawings, Figure 1 is a side elevation of a baggage-truck embodying the features of the invention and showing the braking attachment released. Fig. 2 is a similar view showing the braking attachment applied. Fig. 3 is a plan view of the running-gear of a baggage-truck, showing the relationship of the brake bar or beam to the front wheels and the location of the pivotal or hinged connection for the tongue with relation to the said wheels and bar. Fig. 4 is a diagrammatic view illustrating a portion of one of the wheels and the brake-beam, the latter being disposed in braking position.

The numeral 1 designates the bed or body of a baggage-truck having front and rear racks 2. The running-gear for the truck comprises front and rear axles having pairs of front and rear wheels 3 and 4, the front and rear axles being secured to the bed or body 1 by well-known means. The front axle and wheels 3 are free to swing under the bed or body and coöperate with a fifth-wheel 5, and projecting forwardly from the front axle in the present instance are hounds 6. To the front extremities of the hounds 6 the rear extremity of a tongue 7 is hinged or pivotally connected by a rod 8. This movable connection for the tongue 7 is only one of many forms of attachment that could be adopted, it being only necessary in any movable coupling means between the tongue 7 and the running-gear of the truck that the said coupling means be disposed approximately in alinement with the peripheries of the forward portions of the front wheels 3. On the rear extremity of the tongue 7 and close to the movable connection therefor with the running-gear a brake bar or beam 9 is rigidly secured, said brake-bar having its opposite extremities also rigid, so that the entire bar will be moved with the tongue 7 and the opposite extremities thereof will be always in position for instant engagement with the front portions of the wheels 3. The brake bar or beam 9 is at all times normally held slightly in advance of the front portions of the wheels 3, so that it will require but very little upward movement of the tongue 7 to bring the rigid ends of the brake bar or beam in contact with the adjacent portions of the front wheels 3.

To hold the tongue 7 elevated and maintain the brake bar or beam 9 in engagement with the front wheels 3, simple means is provided, and consists of a flexible strand, such as a rope or cable 10, which is connected to the free end of the tongue and also to the intermediate portion of the front rack 2, the rope or cable 10 being doubled and intermediately knotted, as at 11. When the tongue is raised in full braking position, as shown by Fig. 2, the brake bar or beam 9 may be maintained in positive contact with the wheels 3 by casting the portion of the rope or cable 10 above the intermediate knot over the end of the tongue to insure retention of the truck in immovable position.

As hereinbefore indicated, the rigidity of the brake bar or beam 9 is an important feature in the successful operation of the present improved truck-brake, because the said brake-bar is always in condition for immediate braking operation or application. This rigidity of the brake-bar and the minimized movement thereof required to bring it into braking position, together with the location of the coupling to the running-gear for the tongue approximately in alinement with the peripheries of the forward portions of the wheels 3, renders it possible to bring the ends of the brake-bar 9 in contact with the adjacent portions of the wheels 3 nearly in planes at right angles, as shown by Fig. 4, and with such resisting force in view of the location of the brake-beam in adjacency to the coupling means for the tongue that movement of the forward wheels 3 will be instantly checked without straining the running-gear and requiring a comparatively small amount of leverage or upward pressure on the tongue in view of the further fact that the weight on the truck will assist in the braking operation on account of the tendency to forward movement of the truck under such weight conditions. A further advantage of the improved braking attachment is that it can be readily applied to any truck now in use without in the least disorganizing or rearranging the parts of the same, it only being necessary to preserve the principle of operation of the bar or beam 9 in the manner hereinbefore specified, and which is to locate said bar adjacent to the coupling between the tongue and running-gear and slightly in advance of the forward wheels. The ends of the bar or beam 9 are shown as formed with recesses at their inner ends; but it will be understood that any of the well-known and approved forms of brake-shoes might in some instances be used, though it is preferred that the bar be as light as possible and unimpeded in its operation by the interposition of shoes. It will also be understood that wear-plates now commonly employed may also be applied to the ends of the brake bar or beam. The dimensions of the brake bar or beam will be proportionate to the parts of the truck with which it is used, and as the braking attachment is simple and comparatively inexpensive it may be applied at a minimum cost.

Having thus fully described the invention, what is claimed as new is—

1. The combination with a vehicle having a vertically-movable tongue connected to the front portion of the running-gear, of a pivotal coupling means for the tongue disposed in transverse alinement with the peripheries of the front portions of the forward wheels, and a brake-bar rigidly secured on the rear end of the tongue in advance of the said pivotal coupling means and having the ends thereof rigid and normally slightly in advance of the front portions of the forward wheels, whereby the elevation of the tongue will cause the opposite extremities of the brake-bar to gradually move closer toward the forward portions of the wheels to bring the said extremities of the bar into contact with the said forward portions of the wheels in planes at right angles to the latter.

2. The combination with a vehicle having a tongue coupled to the front portion of the running-gear thereof and vertically movable, a pivotal coupling means for the tongue disposed in transverse alinement with the peripheries of the front portions of the forward wheels, a flexible doubled strand connected at one extremity to the free end of the tongue and at the opposite extremity to the vehicle and having the intermediate portions connected, and a brake-bar rigidly secured to the rear end of the tongue in advance of the pivotal coupling means for the latter and provided with rigid extremities normally held slightly in advance of the front portions of the forward wheels of the running-gear.

In testimony whereof I have hereunto set my hand in presence of two subscribing witnesses.

HARRY S. PARKER.

Witnesses:
 ALFRED L. PARKER,
 B. M. WOODWARD.